United States Patent [19]

Geno et al.

[11] Patent Number: 4,787,607
[45] Date of Patent: Nov. 29, 1988

[54] AIR SPRING HAVING INTERNAL SEALING BAND AND METHOD OF INSTALLING SAME

[75] Inventors: Wayne H. Geno, Cicero; Keith E. Hoffman, Atlanta, both of Ind.

[73] Assignee: The Firestone Tire & Rubber Company, Akron, Ohio

[21] Appl. No.: 94,479

[22] Filed: Sep. 8, 1987

Related U.S. Application Data

[63] Continuation-in-part of Ser. No. 910,715, Sep. 24, 1986, abandoned.

[51] Int. Cl.$^4$ .............................. F16F 9/04; F16F 5/00
[52] U.S. Cl. ............................. 267/64.27; 267/64.24; 267/64.11; 267/64.21
[58] Field of Search ............. 74/18.2; 267/74, 64.19, 267/64.21, 64.23, 64.24, 64.27, 122, 153; 29/451, 450, 235

[56] References Cited

U.S. PATENT DOCUMENTS

| | | | |
|---|---|---|---|
| 3,140,085 | 7/1964 | Bourcier de Carbon | 267/64 |
| 4,037,305 | 7/1977 | Larsson | 29/421 |
| 4,564,177 | 1/1986 | Leonard | 267/64.24 |
| 4,690,430 | 9/1987 | Buma | 267/64.21 X |

Primary Examiner—Andres Kashnikow
Assistant Examiner—Richard Potosnak
Attorney, Agent, or Firm—Ronald Brietkrenz

[57] ABSTRACT

An air spring for motor vehicles including first and second end members, at least one of which is a piston, with an intervening flexible sleeve forming a fluid pressure chamber therebetween sealingly connected to the end members. A continuous annular sealing band clamps at least one end of the flexible sleeve within an annular recess formed on the inside surface of an annular wall portion of one of the end members within an open end of the end member by compressing the sleeve material between the band and wall, and without deforming the band or wall of the end member beyond their elastic limits. In one embodiment, the annular wall of the end member is formed of plastic and is deformed outwardly but maintained within its elastic limits upon insertion of the band within the open end. The end of the sleeve is rolled over the sealing band and then the sleeve end and band are inserted by a press plate into the open end of the end member with the band compressing and sealing the flexible material of the sleeve into the annular recess. The compressed flexible material expands to seal the sleeve against the end member. In another embodiment, the press plate expands the plastic material of the end member outwardly upon inserting the band and a rolled end of the flexible sleeve into the annular recess of the annular wall portion whereupon the wall attempting to return to its unstressed state seals the flexible sleeve between the sidewall and band.

14 Claims, 4 Drawing Sheets

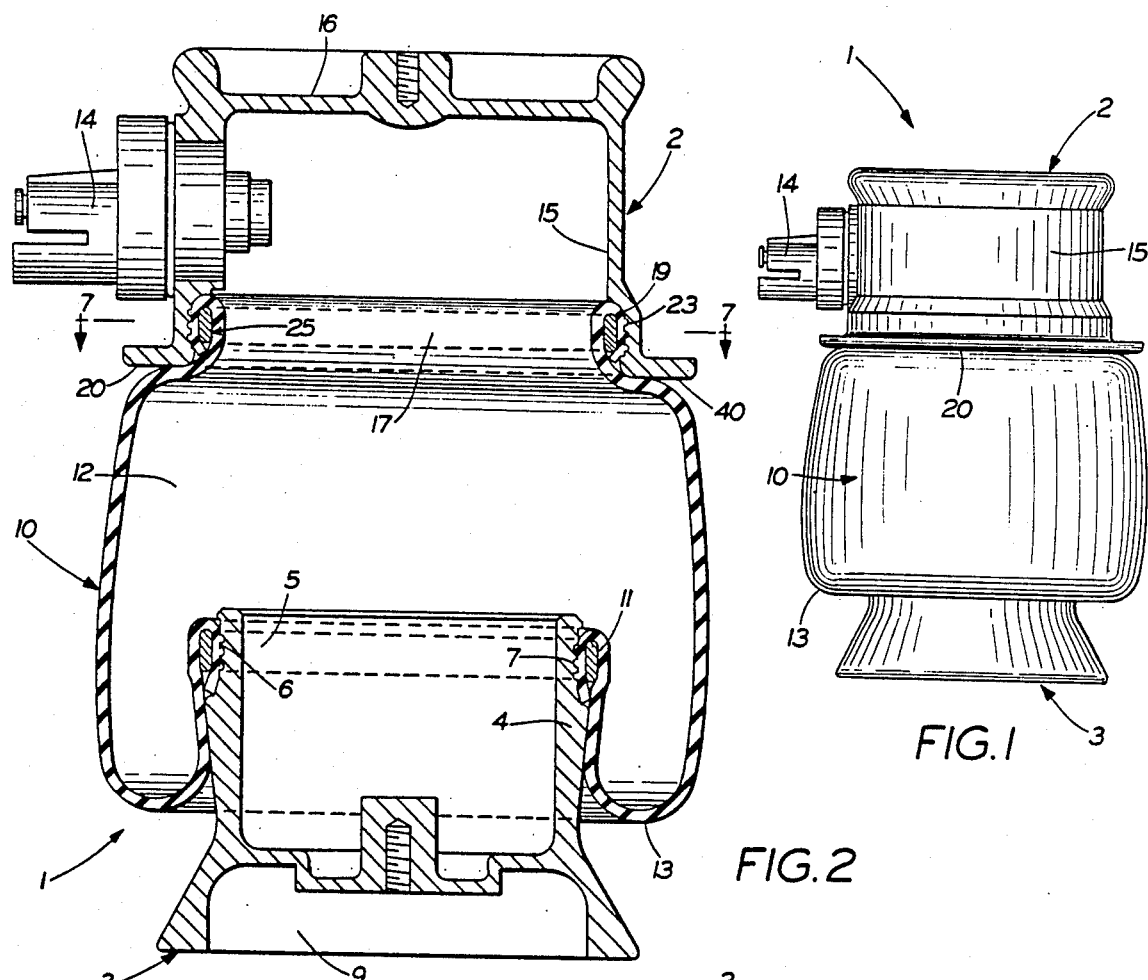
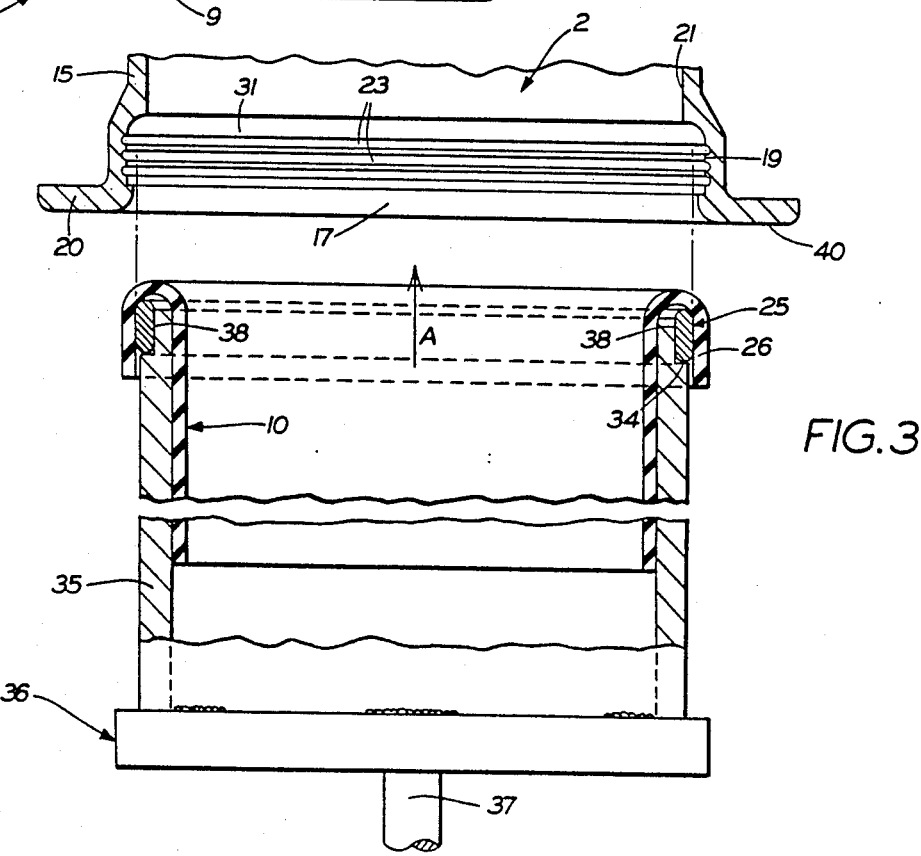
FIG.1
FIG.2
FIG.3

AIR SPRING HAVING INTERNAL SEALING BAND AND METHOD OF INSTALLING SAME

CROSS-REFERENCE TO RELATED APPLICATION

The present application is a continuation-in-part of copending application Ser. No. 910,715, filed Sept. 24, 1986 now abandoned.

TECHNICAL FIELD

The invention relates to vehicle suspensions and particularly to an air spring having an internal sealing band and to the method of installing the same.

BACKGROUND ART

Pneumatic springs, commonly referred to as air springs, have been used for motor vehicles for a number of years to provide cushioning between movable parts of the vehicle, primarily to absorb shock loads impressed on the vehicle axles by the wheels striking an object in the road or falling into a depression. The air spring usually consists of a flexible rubber sleeve or bellows containing a supply of compressed fluid and has one or more pistons located within the flexible resilient sleeve. The piston causes compression and expansion of the fluid within the sleeve as the sleeve compresses and expands as the vehicle experiences the road shocks. The spring sleeve is formed of a flexible elastomeric material which permits the pistons to move axially with respect to the sleeve and within the interior of the sleeve.

The ends of the sleeves are sealingly connected to the piston and/or an opposite end cap if only one piston is used in the particular spring construction. The clamping of the ends of the flexible sleeve onto the piston and/or end member is always one of the important and major assembling steps in the production of air springs. Heretofore, the usual manner of sealing the sleeve against the piston and/or end cap has been by clamping an exteriorly located metal band against the flexible sleeve which crimps and squeezes the rubber material thereof against a sealing surface of the piston or end member. These prior art sealing methods and structures require a permanent deformation of the clamping band and require equipment to supply sufficient pressure to the metal clamping band to permanently deform the metal upon crimping it radially inwardly against the sealing surface of the adjacent air spring member.

It is preferred for certain air spring applications to internally clamp one or both ends of the flexible sleeve outwardly against an inner surface of the end cap and/or piston member to save space and reduce the number of components needed in the air spring assembly. Several known prior art devices having flexible sleeves including air springs use an internal clamping band and are shown in the patents described briefly below.

U.S. Pat. No. 2,115,072 shows the sealing of both ends of the sleeve of an air spring by trapping them in an annular groove of end caps in combination with external annular clamping rings which are bolted to the end caps.

U.S. Pat. No. 2,641,486 shows a usual split ring clamping arrangement. The split ring is compressed by reducing the spacing of the gap between the split ends of the ring afterwhich the ring expands outwardly against a sleeve of material clamping the sleeve internally against an outer supporting structure. However, split rings cannot readily obtain the amount of clamping force required to form a satisfactory seal in an air spring application.

U.S. Pat. No. 3,027,176 shows an air spring having an internal sealing arrangement by use of an annular bead at the ends of the flexible sleeve similar to the sealing bead of a pneumatic tire.

U.S. Pat. No. 3,053,528 shows an air spring in which one end of the flexible sleeve is internally clamped against an outer cylindrical housing by a wedge-shaped end cap. The cap is forced into a wedging relationship with the end of the flexible sleeve by the internal fluid pressure of the air spring.

U.S. Pat. No. 3,527,451 shows another shock absorber which has an internal band which clamps the flexible sleeve against the inner surface of an outer cylindrical housing. It is believed that the internal clamping is achieved either by a wedging action of the internal clamping band against the trapped flexible sleeve end or by a permanent deformation of the internal clamping band in a similar manner as the crimping of a sealing band on the exterior of the flexible sleeve as used in many prior external clamping band arrangements.

U.S. Pat. No. 4,489,474 discloses an air spring in which the flexible sleeve is clamped by external sealing bands to the end cap members.

U.S. Pat. No. 4,506,910 discloses an air spring having a flexible sleeve clamped to an inside of an open end of an end cap.

U.K. Patent No. 2,116,667 discloses an air spring structure containing a flexible sleeve with one edge rolled over a metal ring which is compressed in a fluid tight manner against the inside of a cylinder by a ring in which the end cap is formed of a plastic.

U.S. Pat. No. 4,037,305 discloses a cylindrical core and a sealing ring inserted into an outer casing resulting in a fluid tight seal and limited outward expansion of the side wall of the outer casing. The outward diameter of the inner cylinder is generally equal to the inner diameter of the casing.

U.S. Pat. No. 4,489,830 discloses a retaining device wherein the sidewalls expand at insertion of a second member and then contract slightly to grasp the member as it settles into grooves formed in the side wall.

U.S. Pat. No. 4,653,170 discloses a device where an inner cylinder and a sealing means is inserted into a friction fit with an outer casing where the side walls of the casing are elastically expanded outwardly by the insertion.

German Patent No. 1,273,939 discloses a sealing ring inserting tool.

U.S. Pat. No. 3,140,085 discloses an air spring structure containing a sleeve in which one edge is rolled over a metal ring which applies a squeezing action to the rolled edge of the flexible sleeve or diaphragm as it is sidably received within the interior of a shock absorbing cylinder. The ring has a cylindrical configuration and the diaphragm is maintained in position between a supply of oil and a supply of gas trapped within the shock absorber cylinder.

Therefore, the need has existed for an improved air spring and method of making the same which contains an internal sealing band for sealingly securing the flexible sleeve against an end cap and/or piston member of the air spring.

DISCLOSURE OF THE INVENTION

Objectives of the invention include providing an improved air spring construction for motor vehicles having a piston at one end and preferably an end cap at the other end with an intervening flexible sleeve formed of an elastomeric material, in which the sleeve is camped at either one or both ends thereof to the adjacent member by an internal clamping sealing band without crimping or deforming the sealing band beyond its elastic limit, to achieve a generally airtight clamping seal for the flexible sleeve. Another objective is to provide such an improved air spring in which the internal sealing band clamps the flexible sleeve within an annular recess formed in a cylindrical wall of an end cap, which end cap may be either plastic or metal, in which the end of the flexible sleeve is rolled about the sealing band, and in which an open end of the end cap member is provided with an outwardly extending flange having a smooth curved area to strengthen the bottom of the end cap member and to assist in the roll of the flexible sleeve about the end cap end.

A still further objective of the invention is to provide such an improved air spring in which the internal sealing band and/or annular sealing surface on the interior of the end cap wall is formed with a plurality of grooves or ribs to assist in retaining the flexible sleeve end trapped therebetween, and in which the material of the flexible sleeve is compressed to within the range of 30%–60% of its uncompressed thickness when in a clamped at-rest condition. A further objective is to provide such an improved air spring in which the sealing band has an outer diameter smaller than the internal diameter of the recessed sealing surface formed on the cylindrical wall of the end cap when the end cap is formed of metal, to form an annular space therebetween, which space has a radial dimension less than the thickness of the flexible sleeve to insure that the sleeve is compressed when installed between the sealing band and end wall of the end cap member.

Another objective of the invention is to provide such an improved air spring in which the end cap member can be formed of plastic, preferably a glass fiber reinforced high strength plastic material, which is expanded outwardly within its elastic limit upon insertion of the sealing band and flexible sleeve end into the open end thereof, whereupon the elasticity of the plastic material upon attempting to return the stressed end wall to its unstressed position, will clamp the flexible material of the sleeve against the internal sealing band. A still further objective is to provide such an improved air spring in which an annular lip is provided within the open end of the end cap member adjacent the sealing surface to assist in retaining and restricting movement of the compressed flexible sleeve material therefrom.

Another objective of the invention is to provide such an improved air spring in which the sealing band is formed with an annular recess in its outer circumferential surface for receiving an annular inwardly extending lip which is formed on the end cap wall to provide a lock between the sealing band and end cap.

A still further objective of the invention is to provide an improved method for simply and economically installing an internal sealing band within the open end of an end cap member by the use of a press plate which inserts the sealing band and rolled end of the flexible sleeve into the open end of the end cap by compressing the rolled end portion of the elastomeric sleeve and stressing or expanding outwardly the open end of the end cap wall without permanently deforming the end cap or internal sealing band.

A further objective of the invention is to provide such an improved air spring having an internal sealing band and a method of installing the same which may reduce the number of parts heretofore required in the assembly of such an air spring of the type having an external clamping band, which will save space in certain installations by eliminating the exterior sealing band, and in which the end cap member can be formed either of plastic or metal without affecting the results achieved thereby.

These objectives and advantages are obtained by the improved air spring of the invention, the general nature of which may be stated as including cap means for mounting the air spring on a vehicle, said cap means having a cup-like configuration with an annular side wall terminating in an inwardly extending lip which defines an open end and which has an inner annular sealing surface generally adjacent said open end and said lip; a piston member adapted to be mounted on the vehicle and located in a spaced relationship from the open end of the cap means; a fluid pressure chamber formed between the cap means and piston member by a flexible sleeve sealingly connected at opposite ends thereof to the cap means and piston member; and a continuous annular sealing band located within the open end of the cap means concentric with the inner annular sealing surface of said cap means with one end of the flexible sleeve being located between the sealing end and the sealing surface and placed in a state of compression by the sealing band which is in a non-deformed state to form a generally air tight seal with said sealing band and annular sealing surface, said sealing band having an annular configuration with inner and outer circumferential surfaces connected at one end by a convex smooth rounded surface and having an annular recessed area formed in said outer surface with the cap means lip extending into said recessed area to compress a portion of said one end of the flexible sleeve therebetween.

These objectives and advantages are further obtained by an improved method of the invention for installing an internal sealing band in an air spring, the general nature of which may be stated as incuding the steps of providing an end member having a generally cylindrical wall and an inner annular sealing surface formed thereon generally adjacent an open end thereof; rolling one end of a flexible sleeve over a continuous unstressed annular sealing band; and inserting the rolled end of the flexible sleeve and sealing band into the open end of the end member placing a portion of the flexible sleeve in compression between the sealing end and annular sealing surface to sealingly clamp and seal the flexible sleeve against the end member within the open end without deforming either the sealing band and end member beyond their elastic limits.

BRIEF DESCRIPTION OF THE DRAWINGS

Preferred embodiments of the invention, illustrative of the best mode in which applicants have contemplated applying the principles, are set forth in the following description and are shown in the drawings and are particularly and distinctly pointed out and set forth in the appended claims.

FIG. 1 is an elevational view of the improved air spring in a static or at-rest position;

FIG. 2 is a longitudinal sectional view of the improved air spring shown in FIG. 1;

FIG. 3 is a fragmentary diagrammatic sectional view showing one step of the improved method for installing the internal sealing band within the end cap of the air spring of FIGS. 1 and 2;

Similar numerals refer to similar parts throughout the drawings.

BEST MODE FOR CARRYING OUT THE INVENTION

Figure 4:
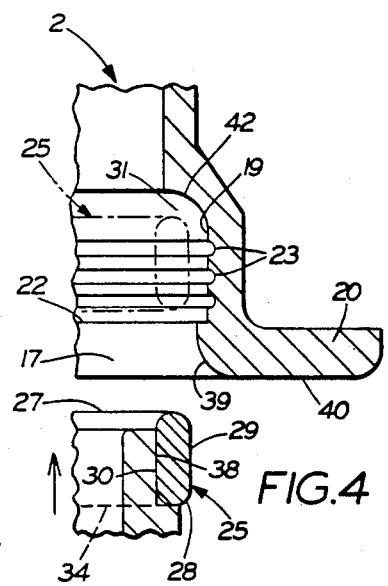
FIG. 4 is an enlarged fragmentary sectional view of the sealing band in full lines prior to being installed within the open end of the end cap, and of the sealing band in phantom lines installed within the open end of the end cap.

The improved air spring of the invention is indicated generally at 1, and is shown in an at-rest position in FIGS. 1 and 2. Air spring 1 includes an end cap member and an opposed piston member, indicated generally at 2 and 3, respectively. Piston member 3 has a generally cylindrical side wall 4 terminating in an upper open end 5 and having an exterior annular clamping surface 6 formed with a plurality of grooves 7.

One end of a flexible sleeve indicated generally at 10, is sealingly clamped in a generally air tight relationship against surface 6 by an exterior annular sealing band 11 which is compressed and crimped to seal the sleeve end against clamping surface 6 in a manner well known in the air spring art. Piston member 3 further includes a closed mounting end 9 for attaching the air spring on a portion of a vehicle (not shown) in a manner known to those skilled in the air spring art. The particular configuration and arrangement of piston member 3 may vary without affecting the concept of the invention.

Flexible sleeve 10 has a generally cylindrical configuration and is formed of an elastomeric material generally containing internal reinforcing fabric (not shown) which is trapped within one or two plys of an elastomer, also well known in the air spring art. Preferably at least one end portion of flexible sleeve 10 indicated by numeral 13, is in a rolled state when in an at-rest position to permit piston member 3 to move axially away from end cap 2 without damaging sleeve 10. End cap 2 is provided with a solenoid control valve 14 for regulating the fluid pressure within the air spring and forms no particular part of the present invention.

End cap 2 has a cup-shaped configuration with a cylindrical side wall 15 terminating in a closed end wall 16 and an open end 17 which communicates with the interior 12 of flexible sleeve 10. Sleeve interior 12 provides the compressed fluid chamber for air spring 1.

Figure 6:
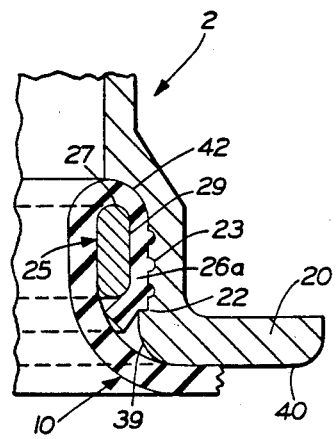
FIG. 6 is an enlarged fragmentary sectional view showing the next step of the improved method after that of FIG. 5 in which the installation press plate has been removed and the sealing band securing the rolled end of the flexible sleeve within the open end of the end cap.
Figure 7:
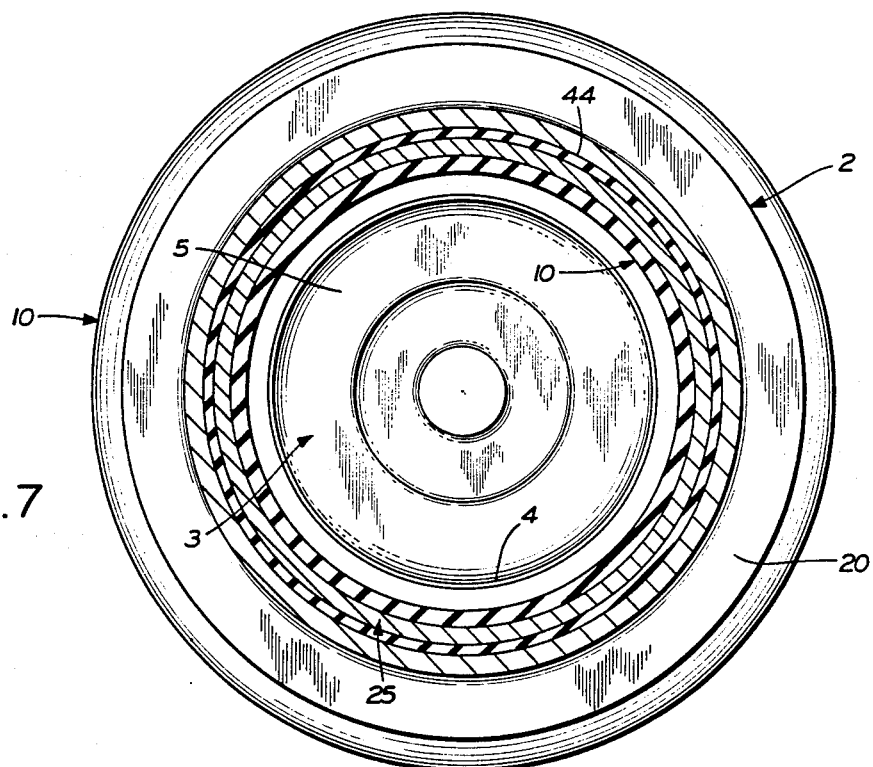
FIG. 7 is an enlarged sectional view taken on line 7—7, FIG. 2.

In accordance with one of the features of the invention, an annular sealing surface 19 (FIG. 4) is formed on the inner surface 21 of side wall 15 adjacent open end 17 thereof and has a recessed configuration. Open end 17 of wall 15 is defined by a radially outwardly extending flange 20 which adds strength to the open end of the end cap and provides for a smooth surface about which the flexible sleeve may extend as shown in FIG. 6. Flange 20 is connected to recessed sealing surface 19 by an annular lip 22 which assists in forming the recessed configuration of sealing surface 19 and in securing a clamped end portion of sleeve 10 therein. A plurality of annular grooves 23 are formed in sealing surface 19 to further secure the clamped end of sleeve 10 therein.

An annular sealing band indicated generally at 25 (FIG. 8) is located within the open end 17 of end wall 15 and clamps a rolled end 26 of flexible sleeve 10 against and within recessed annular sealing surface 19. Sealing band 25 is a continuous preferably metal member, having rounded top and bottom surfaces 27 and 28 and generally smooth flat outer and inner circumferential surfaces 28 and 30, respectively.

In the particular embodiment shown in FIGS. 1-8, end cap 2 and in particular cylindrical wall 15 thereof, is formed of metal as is sealing band 25. The outer diameter of band 25 represented by the diameter of surface 29 will be less than the internal diameter of annular sealing surface 19 so as to form an annular space 31 therebetween which has a radial width less than the thickness of flexible sleeve 10 represented at 32 in FIG. 5. Stated differently, the outer diameter of band 25 is less than the inner diameter of annular sealing surface 19 with the difference being not greater than twice the thickness of the flexible sleeve material. This relationship insures that the sleeve material located in annular space 31 will be in a compressed state when trapped therein between band 25 and sealing surface 19. The relationship of band 25 and annular sealing surface 19 and rolled end 26 of sleeve 10 is shown in exaggerated condition in FIGS. 4–6 for purposes of illustration. The installed static condition of sealing band 25 and trapped sealed end 26 is shown in FIG. 6.

The improved method of the invention for installing internal sealing band 25 is shown particularly in FIGS. 3–6. Band 25 is placed on an annular stepped shoulder 34 formed at the top open end of a cylindrical wall 35 of a press plate indicated generally at 36, which plate is mounted for movement on the end of a ram 37. Step shoulder 34 has an axially extending annular wall 38, the height of which is less than the height of ring 25 with the radial length of shoulder 34 being generally less than the thickness of band 25, as shown particularly in FIGS. 4 and 5.

Figure 5:
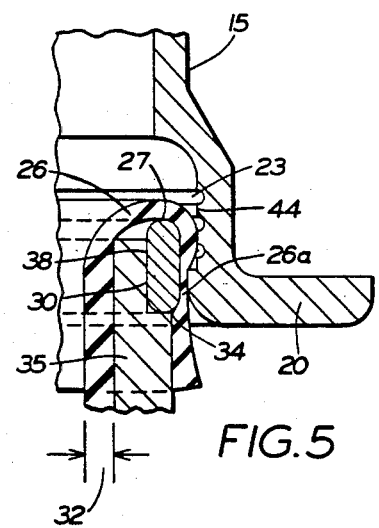
FIG. 5 is a fragmentary sectional view similar to FIG. 4 showing a further step of the improved installation method from that of FIG. 4 wherein the rolled end of the flexible sleeve is being compressed within the open end of a metal end cap.

After placing band 25 on shoulder 34, end 26 of sleeve 10 is rolled about the band as shown in FIG. 3. Press plate 36 then is moved in the direction of arrow A moving band 25 and rolled sleeve end 26 into open end 17 of end cap 2. Upon entering end cap 2, a portion of 26a of rolled end 26 is stretched upon passing a smooth annular curved surface 39 which joins the bottom surface 40 of flange 20 with annular lip 22 (FIG. 5). When inserting and squeezing rolled end 26 past and along surface 39, the thickness of the sleeve material may be compressed almost 90% of its original thickness without damaging the internal reinforcing cords. Upon passing over lip 22, as shown in FIG. 5, a portion of the elastomeric material of rolled end 26 becomes trapped in annular space 31 against recessed annular sealing surface 19 and expands outwardly into annular grooves 23 thereof to assume a final partially compressed state as shown in FIG. 6.

In the installed position of FIG. 6, a portion of rolled end 26 will be compressed to within a range of 30%-60% of its original thickness which will provide a sufficiently tight seal between band 25 and sealing surface 19 to prevent the escape of compressed air therebetween. The continuous configuration of installed clamping band 25 will prevent any inward radial movement or collapsing of the band, and the strength of metal can side wall 15 will prevent any excess outward expansion of the end cap which could break the seal formed by the compressed elastomer material therebetween. Annular lip 22 formed at the lower end of sealing surface 19 in combination with curved upper surface 42 which joins sealing surface 19 with internal cylindrical surface 21 of wall 15, will assist in retaining sealing band 25 and the trapped portion of elastomer material therein. It is easily seen that after insertion of band 25 and rolled end 26 of sleeve 10 within annular space 31 where a portion of rolled end portion 26 is pressed against recessed surface 19 as shown in FIG. 5, press plate 36 can be withdrawn therefrom with band 25 and rolled end 26 remaining therein.

Figure 8:
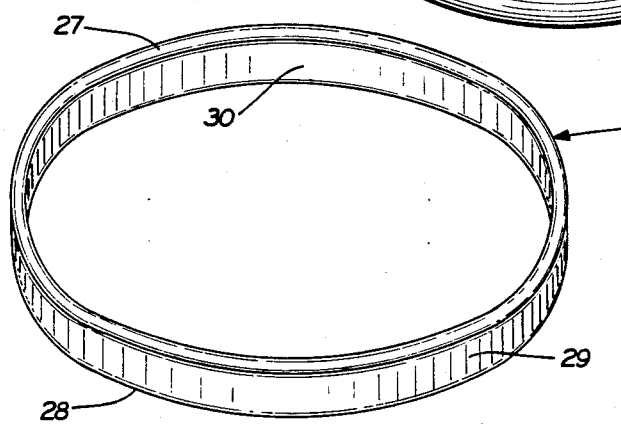
FIG. 8 is a prespective view of the sealing band.
Figure 9:
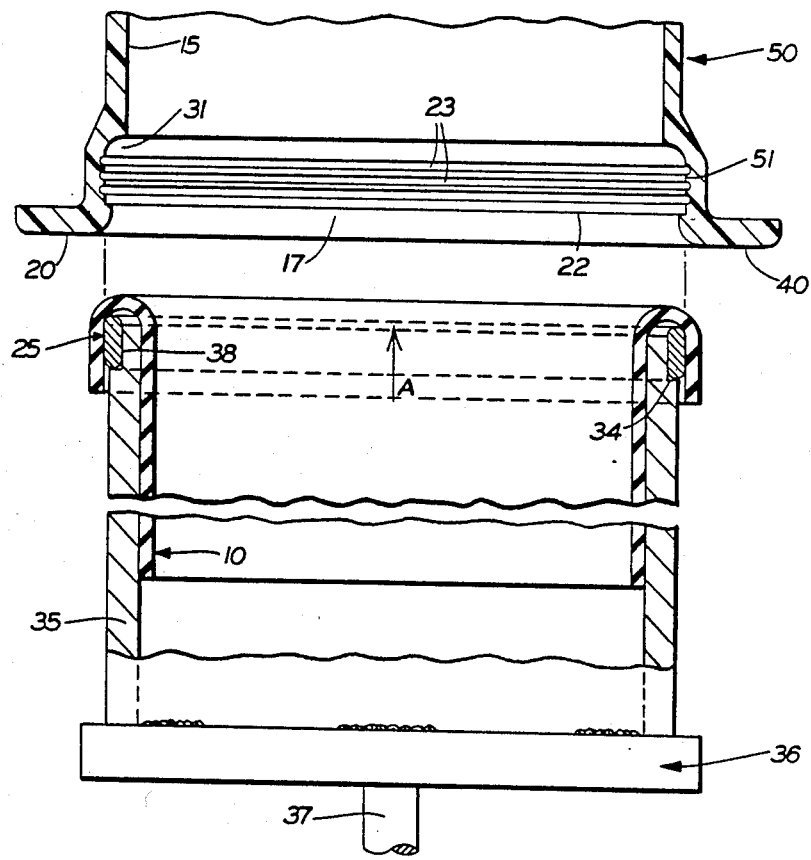
FIG. 9 is a diagrammatic sectional view similar to FIG. 3 showing the start of the installation of the sealing band in the open end of a plastic end cap member.
Figure 10:
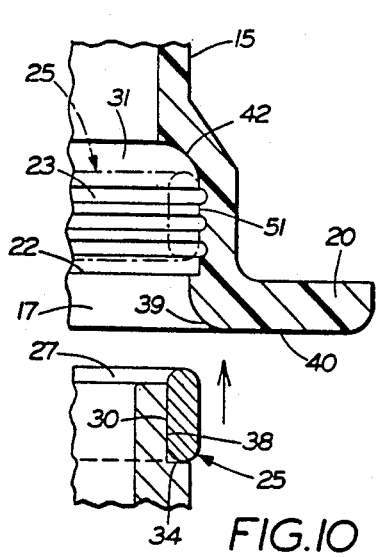
FIGS. 10, 11 and 12 are enlarged diagrammatic sectional views similar to FIGS. 4, 5 and 6, showing the method of installing the sealing band within the open end of a plastic end cap.
Figure 11:
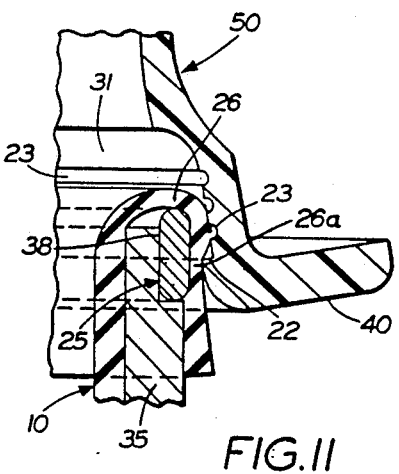
Figure 12:
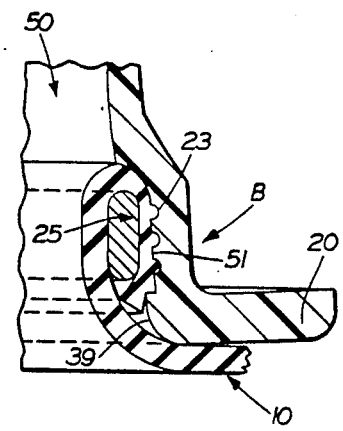

A modified embodiment of the improved air spring and method of installing the internal sealing band is shown in FIGS. 9-12 and is similar in many respects to the embodiment shown in FIGS. 1 and 8. The main difference of the second embodiment is that the end cap member indicated generally at 50, is formed of a plastic material. End cap 50 has a similar open end configuration as that of end cap 2 and includes an annular recessed sealing surface 51 similar to sealing surface 19. Referring to FIG. 10, the outer diameter of sealing band 25 will be equal to or slightly larger than the internal diameter of annular sealing surface 51 as shown in phantom lines therein. Upon inserting rolled end 26 of flexible sleeve 10 by means of press plate 36, band 25 and rolled end 26 will expand the lower portion of end cap 50 which defines open end 17, in an outwardly direction shown in a greatly exaggerated position in FIG. 11. This outward expansion permits band 25 and rolled end 26 to pass beyond annular lip 22 and into annular space 31 adjacent sealing surface 51. Sleeve end portion 26a will be squeezed and stretched in a similar manner as in the first embodiment as shown in FIG. 5, but to a less amount upon inserting the rolled sleeve end into the open end of the end cap.

Upon removal of press plate 36, the outwardly expanded lower end of cap member 40 will move inwardly in the direction of arrow B (FIG. 12) securely clamping the trapped portion of sleeve end 26 between band 25 and sealing surface 51 in a similar manner as discussed above with respect to FIG. 6. In this second embodiment, the thickness of the clamped material preferably is compressed to within 30%-50% of its original thickness.

In accordance with one of the main features of the second embodiment, the plastic material in the lower end of end cap 50 is not expanded beyond its elastic limit so that upon removal of press plate 36 it will attempt to return to its unstressed state, which provides the clamping force for pressing the elastomeric material against the outer surface of band 25. Again, band 25 is a continuous annular ring, and it is not collapsed inwardly or expanded outwardly when installed within the open end of end cap 50. Band 25 in combination with the inward movement of the lower portion of end cap 50 will seal the elastomer material therebetween. End cap 50 preferably is formed of a high strength plastic such as a glass filled acetal resin of the type identified as Delrin 100 or 500 which is a registered trademark of E. I. DuPont de Nemours or a mineral filled thermoplastic resin such as Minlon, or a glass filled nylon resin such as Zytel 66, both of which are registered trademarks of E. I. DuPont de Nemours. These particular plastics have been found to have sufficient rigidity to prevent cracking upon insertion of the sealing band and rolled sleeve end, and have sufficient resiliency to clamp the elastomeric material against band 25.

Again, it is important in practicing the method of the invention when installing band 25 in end cap 50 to achieve the internal clamping arrangement, that the plastic material of end cap 50 not be stretched beyond its elastic limit and that the outer diameter of sealing band 25 is generally equal to the internal diameter of annular sealing surface 51. It is readily apparent to one skilled in the art that by varying the types of plastic used for end cap 50 and the relationship of the diameters of sealing band 25 and clamping surface 51 that various amounts of clamping force can be achieved. It is important that the elastomeric material of sleeve 10 that is clamped between band 25 and surface 51 be compressed generally to within the range of 30%-60% of its uncompressed thickness whereupon it will flow into annular grooves 23 and provide an air tight seal.

Figure 13:
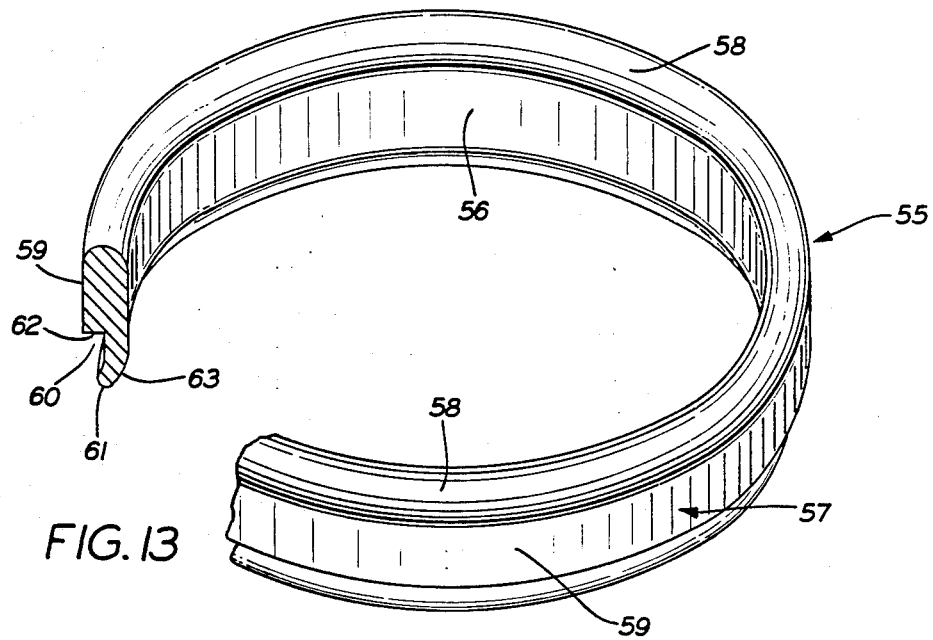
FIG. 13 is an enlarged perspective view with portions broken away and in section of a modified annular internal sealing band.
Figure 14:
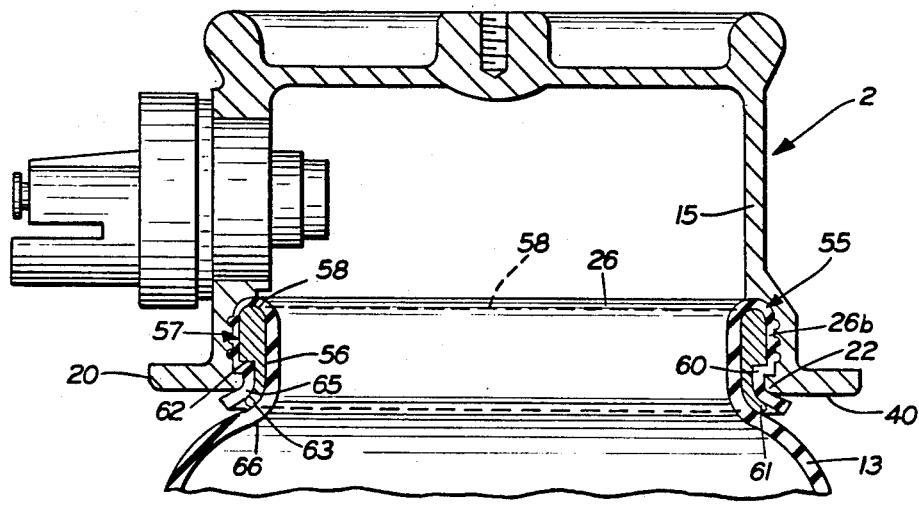
FIG. 14 is a sectional view of the upper portion of the air spring as shown in FIG. 2, showing the modified sealing band of FIG. 13 incorporated therein.
Figures 15, 16:
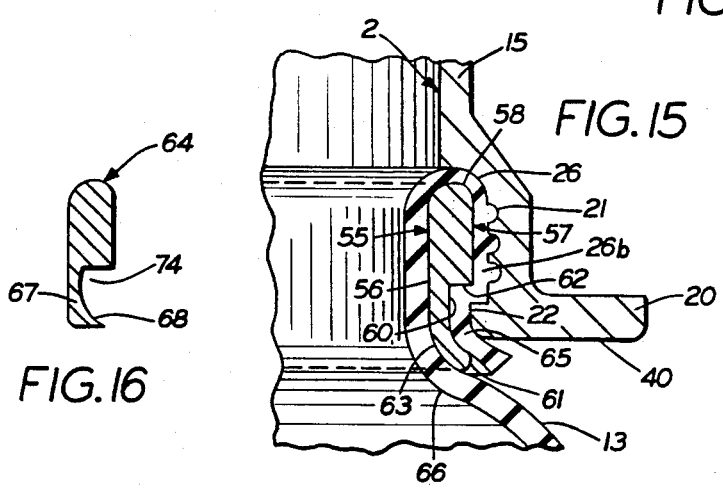
FIG. 15 is a greatly enlarged fragmentary sectional view showing the modified sealing band of FIGS. 13 and 14 securing the rolled end of the flexible sleeve within the open end of the end cap.
FIGS. 16, 17 and 18 are enlarged cross-sectional views of additional internal sealing band configurations.

A modified form of sealing band is indicated generally at 55, and shown particularly in FIG. 13, and is shown in FIGS. 14 and 15 installed in cap member 2. Sealing band 55 includes inner and outer smooth circumferential surfaces 56 and 57 connected by a convex, smooth rounded top surface 58 and a rounded bottom surface 61. An annular recess 60 is formed in outer circumferential surface 57 adjacent lower bottom surface 61. Sealing band 55, as shown particularly in FIG. 15, has a somewhat elongated oval-shaped cross-sectional configuration with recess 60 being defined by a radially inwardly extending shoulder 62 and an outwardly curved lower end 63.

Sealing band 55 is formed of either metal or plastic as described above with respect to sealing band 25, and is installed in end cap 2 by the improved method of the invention. Referring to FIG. 15, inwardly extending lip 22 of end cap 2 extends toward annular recess 60 and inwardly beyond outer circumferential surface 57 of sealing band 55, very slightly compressing a portion 65 of rolled sleeve end 26, and retaining sealing band 55 within the open end of the end cap. The compressed portion of the sleeve indicated at 26b located between the remaining portion 59 of outer circumferential band surface 57 and inner sealing surface 21 of end cap wall 15 provides the main area which secures the sleeve material between cap 2 and band 55. Portion 65 remains in a very lightly compressed state in order to eliminate any residual hoop stresses on cap flange 20. The lowermost end of outwardly curved lower end 63 of band 55 terminates generally adjacent or below bottom surface 40 of flange 20.

Outwardly curved lower end 63 is acted upon by the adjacent portion 66 of flexible sleeve 13 as it expands outwardly by the internal fluid pressure within the sleeve. This force presses curved end 63 toward end cap lip 22 seating it tightly within recess 60 of sealing band 53 to form a lock between the band and end cap. The locking engagement prevents the pressure of flexible sleeve 13 from disengaging end cap 2 from its clamped engagement with the sealing band. Thus, the forces exerted by the inflated sleeve act upon the sealing band through outwardly curved end 63 instead of directly on lip 22 of flange 20 of the end cap which prevents the pressure of flexible sleeve 13 from contacting end cap lip 22 and disengaging end cap 2 from its clamped engagement with the sealing band.

FIG. 16 shows a slightly modified sealing band configuration 64 in which an annular recess 74 is formed in the outer circumferential surface and the bottom edge of outwardly curved lower end 67 terminates in a sharper corner 68.

Figures 17, 18:
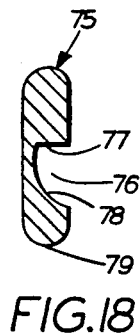

FIG. 17 shows another modified sealing band 70 having an annular recessed area 71 formed generally in the center of outer circumferential surface 72 wherein the lower portion 73 will extend to the level of flange surface 40 or below as does outwardly curved lower end 63 of sealing band 55.

FIG. 18 shows a further modified sealing band 75 in which an annular recessed area 76 is formed by an inwardly extending radial shoulder 77 and a connecting concave surface 78 which terminates in a rounded lower end 79.

Sealing bands 64, 70 and 75 function in a similar manner as does modified sealing band 55 described above. Therefore, these sealing bands and their sealing and compression relationship with the end caps are not described in greater detail, nor shown assembled with the particular configuration of end caps 2 and 50.

Accordingly, the improved air spring construction and method of installation is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring having the internal sealing band is constructed and used, the characteristics of the construction, and the advantageous, new and useful results obtained; the new and useful structures, devices, elements, arrangements, parts, and combinations are set forth in the appended claims.

What is claimed is:

1. An improved air spring for vehicles including
   (a) a cap means for mounting the air spring on a vehicle, said cap means having a cup-like configuration with an annular side wall terminating in an inwardly extending annular lip which defines an open end, and an inner annular sealing surface recessed in an inner surface of the side wall adjacent to and outwardly of said annular lip and generally adjacent said open end;
   (b) a piston member adapted to be mounted on the vehicle and located in a spaced relationship from the open end of the cap means;
   (c) a fluid pressure chamber formed between the cap means and piston member by a flexible sleeve sealingly connected at opposite ends thereof to the cap means and piston member; and
   (d) a continuous annular sealing band located within the open end of the cap means concentric with the inner annular sealing surface of said cap means with one end of the flexible sleeve being located between the sealing band and the sealing surface and placed in a state of compression by the sealing band which is in a non-deformed state to form a generally air tight seal with said sealing band and annular sealing surface, said sealing band having an annular configuration with inner and outer circumferential surfaces connected at one end by a convex smooth rounded surface and having an annular recessed area formed in the outer circumferential surface, the diameter of the outer surface of said sealing band being greater than an inner diameter of the annular lip so that the lip extends into said recessed area of the sealing band to engage a portion of said one end of the flexible sleeve therebetween; and, to retain the sealing band within the open end of the cap means by the annular lip.

2. The air spring defined in claim 1 in which the annular recessed area of the sealing band is concave.

3. The air spring defined in claim 1 in which the annular recessed area of the sealing band is formed by a radially inwardly extending shoulder and an outwardly curved end.

4. The air spring defined in claim 3 in which the outwardly curved end of the sealing band extends beyond the lip of the cap means.

5. The air spring defined in claim 4 in which the flexible sleeve is slightly compressed between the annular lip of the cap means and the outwardly curved end of the sealing band an amount less than the amount of compression of the sleeve between the sealing surface and sealing band.

6. The air spring defined in claim 4 in which the outwardly curved end of the sealing band is forced toward the annular lip of the cap means to compress a portion of the flexible sleeve therebetween upon outward expansion of another portion of said flexible sleeve engaged with said curved end.

7. The air spring defined in claim 1 in which the diameter of the outer surface of the annular sealing band defined by the outer circumferential surface is less than the internal diameter of the annular sealing surface and forms an annular space therebetween; and in which the width of said annular space is less than the thickness of the flexible sleeve.

8. The air spring defined in claim 7 in which the portion of the flexible sleeve clamped between the sealing band and sealing surface is compressed to within 30%-60% of its uncompressed condition.

9. The air spring defined in claim 1 in which the diameter of the outer surface of the sealing band defined by the outer circumferential surface is generally equal to the inside diameter of the annular sealing surface of the cap means.

10. The air spring defined in claim 9 in which the annular side wall of the cap means is a generally cylindrical side wall; and in which said cylindrical side wall is expended outwardly by the flexible sleeve and sealing band retained within the open end of the cap means.

11. The air spring defined in claim 10 in which the cylindrical side wall terminates in an outwardly extending annular flange at the open end of said cap means; and in which the annular sealing surface is recessed in the inner surface of the cylindrical side wall adjacent the annular flange.

12. The air spring defined in claim 11 in which the annular sealing surface is joined to the annular flange by the inwardly extending annular lip.

13. The air spring defined in claim 1 in which the annular sealing surface is formed with a plurality of grooves.

14. An improved air spring for vehicles including:
(a) a cap means for mounting the air spring on a vehicle, said cap means having a cup-like configuration with an annular side wall terminating in an inwardly extending annular lip which defines an open end, and an inner annular sealing surface recessed in an inner surface of the side wall adjacent to and outwardly of said annular lip and generally adjacent said open end;
(b) a piston member adapted to be mounted on the vehicle and located in a spaced relationship from the open end of the cap means;
(c) a fluid pressure chamber formed between the cap means and piston member by a flexible sleeve sealingly connected at opposite ends thereof to the cap means and piston member; and
(d) a continuous annular sealing ring located within the open end of the cap means concentric with the inner annular sealing surface of said cap means with one end of the flexible sleeve being located between the sealing ring and the sealing surface and placed in a state of compression by the sealing ring which is in a non-deformed state to form a generally air tight seal with said sealing ring and annular sealing surface, said sealing ring having an annular configuration with inner and outer circumferential surfaces connected at both ends by convex smooth rounded surfaces; the diameter of the outer circumferential surface of said sealing ring being greater than an inner diameter of the annular lip so that said lip extends inwardly beyond the outer circumferential surface of the sealing ring to engage a portion of said one end of the flexible sleeve therebetween, and, to retain the sealing ring within the open end of the cap means by said annular lip.

* * * * *